(12) United States Patent
Bellingroth

(10) Patent No.: US 7,402,966 B2
(45) Date of Patent: Jul. 22, 2008

(54) LINEAR DRIVE WITH TRAVEL MEASUREMENT

(75) Inventor: Klaus Bellingroth, Gummersbach (DE)

(73) Assignee: Okin Gesellschaft Fur Antriebstechnik mbH ( * ) Notice: Subject to any disclaimer, the term of this patent is extended or adjusted under 35 U.S.C. 154(b) by 0 days.

(21) Appl. No.: 11/556,816

(22) Filed: Nov. 6, 2006

(65) Prior Publication Data
US 2007/0108931 A1 May 17, 2007

(30) Foreign Application Priority Data
Nov. 5, 2005 (DE) .................. 10 2005 052 796

(51) Int. Cl.
*H02P 1/00* (2006.01)
(52) U.S. Cl. .................. 318/135; 318/687; 700/60; 700/228
(58) Field of Classification Search .......... 318/135, 318/687, 568.11; 700/60, 228
See application file for complete search history.

(56) References Cited

U.S. PATENT DOCUMENTS

| | | | | |
|---|---|---|---|---|
| 5,328,303 A | * | 7/1994 | Jang | 408/14 |
| 5,989,485 A | * | 11/1999 | Staacks et al. | 266/76 |
| 6,239,573 B1 | * | 5/2001 | Schmall | 318/687 |
| 2004/0150881 A1 | * | 8/2004 | Luthardt et al. | 359/399 |

FOREIGN PATENT DOCUMENTS

| | | |
|---|---|---|
| DE | 2240728 | 2/1974 |
| DE | 8529883 | 12/1985 |
| DE | 102005035104 | 3/2006 |
| WO | 2006087365 | 8/2006 |

* cited by examiner

*Primary Examiner*—Rina I Duda
(74) *Attorney, Agent, or Firm*—Grossman Tucker Perreault & Pfleger, PLLC

(57) ABSTRACT

The invention concerns a linear drive (1) with a linear stroke for the displacement of movably supported parts, in particular of articles of furniture, comprising a rotary spindle (2) which is driven by a motor and which at the drive output side is in screwthreaded engagement with a thrust tube (3) or a spindle nut (4) connected thereto with a female screwthread (5), wherein the thrust tube (3) is mounted non-rotatably and slidably in the housing (6) and is displaceable in the housing (6) over a stroke travel h relative to the rotary element, and a travel measuring device for measuring the stroke travel h. With the aim of developing a linear drive (1) in such a way that it is uncomplicated and inexpensive, operates reproducibly accurately and even after power shut-down does not require renewed zeroing for travel measurement, it is proposed that the travel measuring device has a linear potentiometer device (7) with a linear potentiometer (8) and that the linear potentiometer (8) for linear measurement of the stroke travel h is arranged parallel to the stroke travel.

20 Claims, 6 Drawing Sheets

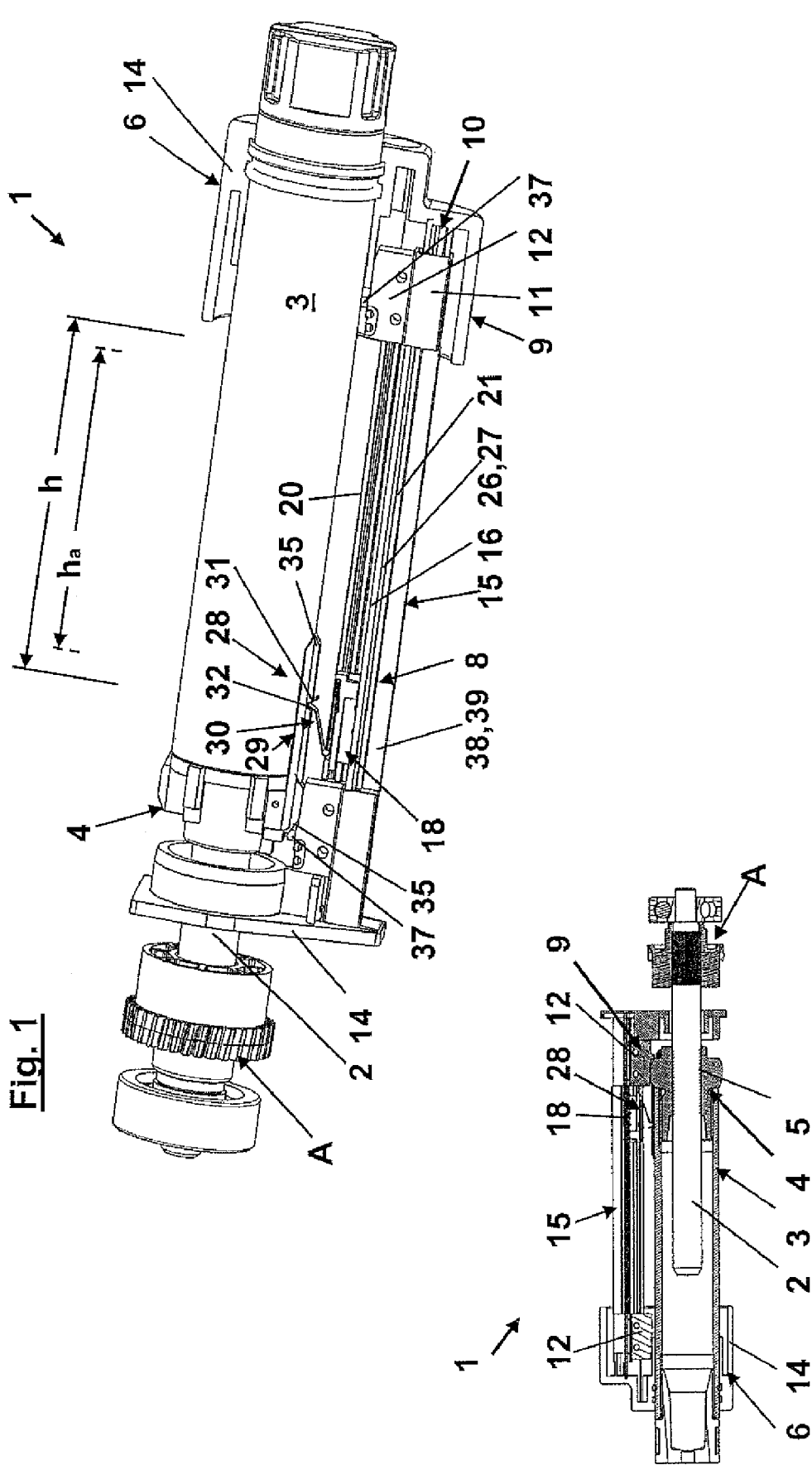

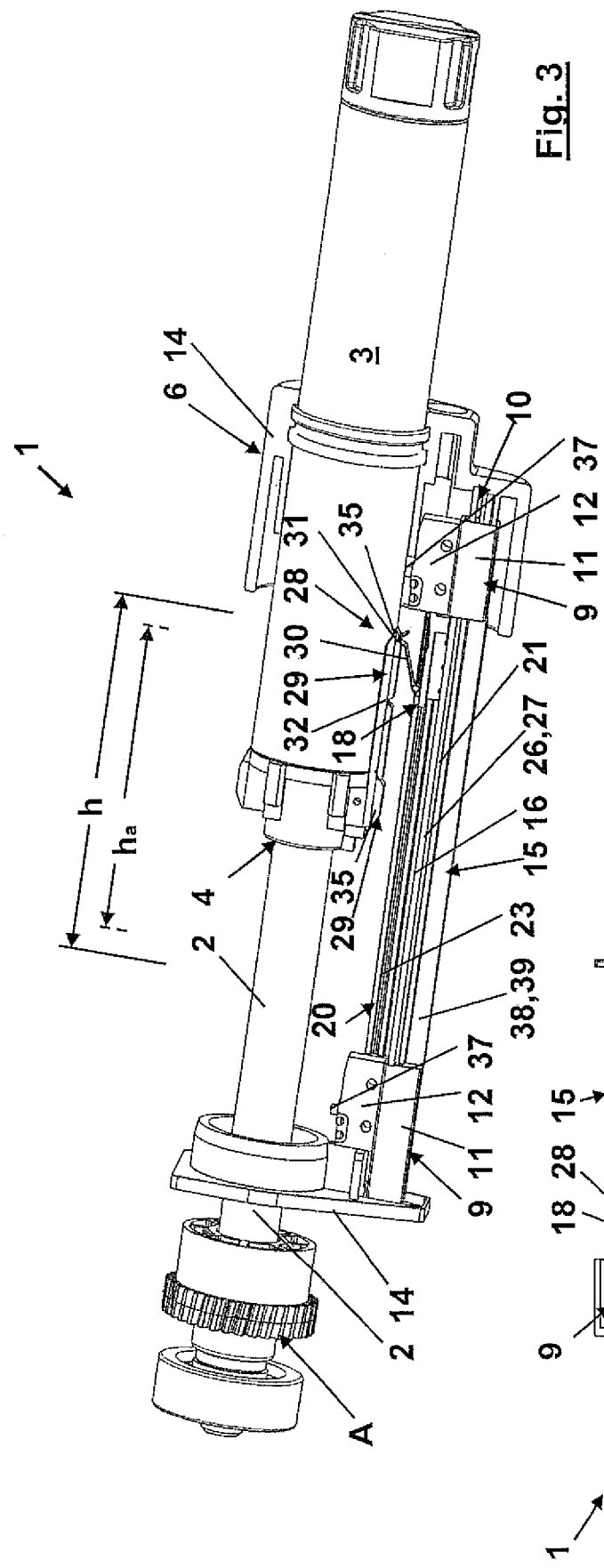

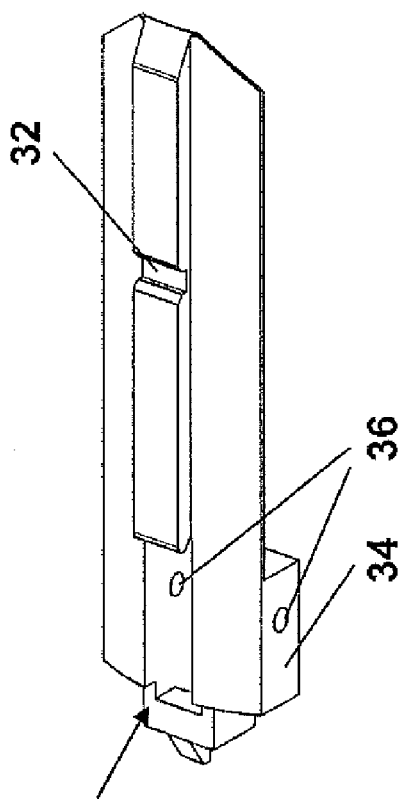
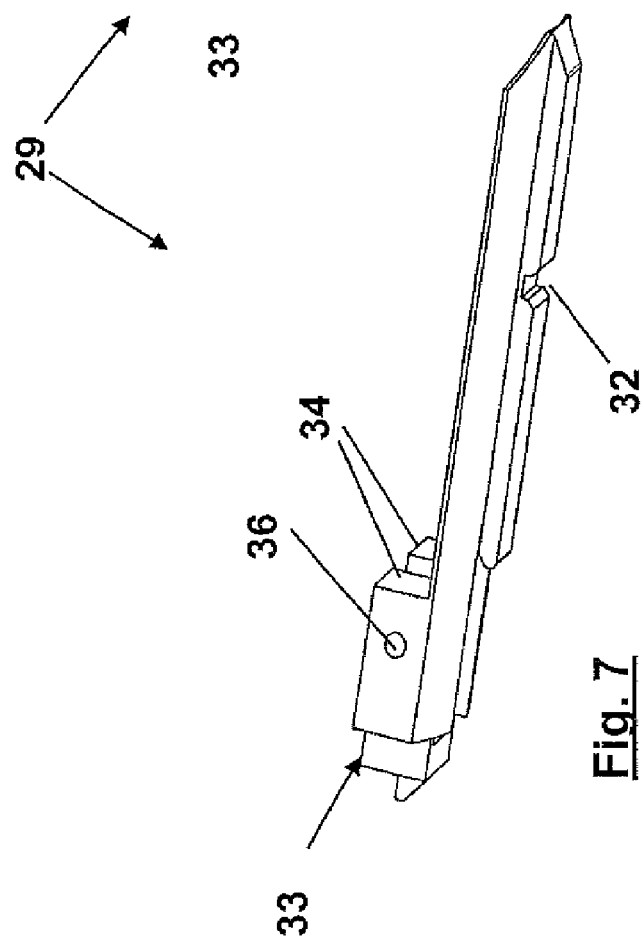
Fig. 8
Fig. 7

LINEAR DRIVE WITH TRAVEL MEASUREMENT

FIELD

The invention concerns a linear drive with a linear stroke for the displacement of movably supported parts, in particular of articles of furniture, comprising a rotary spindle which is driven by a motor and which at the drive output side is in screwthreaded engagement with a thrust tube or a spindle nut connected thereto with a female screwthread, wherein the thrust tube is mounted non-rotatably and slidably in the housing and is displaceable in the housing over a stroke travel relative to the rotary element, and a travel measuring device for measuring the stroke travel.

BACKGROUND

Known linear drives of the kind set forth above frequently involve travel measurement with roller sensors which start from a zero position. In the event of the power being switched off, for example as a consequence of the linear drive not being in use for a prolonged period of time, then for renewed travel measurement so-called zeroing is required to establish a fresh zero position which however is independent of the previous zero position.

That disadvantage is overcome by rotary-potentiometric travel measurement, in which case a rotary potentiometer, connected to the linear drive by way of a step-up transmission arrangement or directly, measures the stroke involved, by way of the number of revolutions of the rotary spindle. That measurement procedure is relatively complicated and expensive and quite inaccurate for example due to screwthread play which occurs.

Therefore the object of the invention is to provide a linear drive of the kind set forth in the opening part of this specification, having travel measurement which is not complicated and expensive, which operates in a reproducibly accurate fashion and which even after power shut-down does not require renewed zeroing for travel measurement.

SUMMARY

According to the invention the specified object is attained in that the travel measuring device has a linear potentiometer device with a linear potentiometer and that the linear potentiometer for linear measurement of the stroke travel is arranged parallel to the stroke travel. The stroke travel can be directly linearly detected by the linear potentiometer, in which respect the prevailing position of the linear potentiometer corresponds to the prevailing position of the thrust tube and rotary spindle which are displaceable relative to each other, and as a result the stroke can be measured and indicated with a substantially higher degree of accuracy than for example when using a rotary potentiometer. It will be appreciated that this direct travel measurement is also possible in relation to other kinds of components in the form of thrust elements and rotary elements which can be displaced linearly relative to each other over a stroke travel distance by way of the actuation of a component, that is to say a thrust element or a rotary element.

Preferably the linear potentiometer is arranged in the housing. The linear potentiometer is thus integrated in the housing. As a result it is protected in the housing. In order to be able to measure travel as accurately as possible the linear potentiometer should be disposed in or at least as closely as possible to the region of the linear drive, in which the relative movement between the rotary spindle and the thrust tube can be directly detected. In that respect the potentiometer can also be positioned in the thrust tube. Preferably however the linear potentiometer is arranged in the immediate proximity with the thrust tube. In the case of a housing having a plurality of chambers the potentiometer should therefore be arranged in a common housing chamber with linear drive. As a linear drive, for use thereof in an aggressive, for example corrosive environment, is generally supported in the housing in sealed relationship, at the same time that provides for optimum protection for the linear potentiometer in the same manner.

In a desirable development of the linear drive the linear potentiometer can be connected to the thrust tube and to the housing. In that case the stroke is detected by way of the stroke travel of the thrust tube relative to the housing. That is expedient for a frequent embodiment of a linear drive, in which the rotary spindle is driven and in so doing remains static relative to the housing while the thrust tube with the spindle nut moves relative to the housing over the stroke travel.

The linear drive can include a limit switch device with two limit switches for stroke-limiting shut-down of the motor. In that case the limit switches can be arranged in a limit switch passage of the housing parallel to the thrust tube in the housing. Desirably the linear potentiometer device can be disposed in the limit switch passage. In that case the linear potentiometer device can be positioned in such a way that in the stroke direction it bears at the end against the limit switches, whereby travel measurement can take place over the entire stroke travel. In accordance with the state of the art, the limit switches can be actuated by way of actuating elements which are arranged on the thrust tube or the spindle nut. For that purpose for example it is possible to provide on the spindle nut a radially outwardly pointing projection which, with displacement of the thrust tube with the spindle nut, passes over the respective limit switch and in so doing actuates it. As the prevailing relative position of the thrust tube with respect to the rotary spindle or with respect to the housing is ascertained by way of the linear potentiometer device, limit shut-down of the drive can also be effected by way of the linear potentiometer device so that the limit switches can then serve as emergency off switches which, in the event of failure of the linear potentiometer device, are intended to cause the drive to be switched off.

With the potentiometer device installed in the limit switch passage, no additional space has to be provided for the potentiometer device in the housing.

In addition it is possible for the potentiometer device to be subsequently installed in an already existing linear drive with a normal limit switch passage. In accordance with usual design configurations the limit switch passage can be opened towards the region of the housing with the thrust tube and forms a housing chamber with the region of the housing, whereby, as will be described hereinafter, a connection in respect of the potentiometer device to the thrust tube over the thrust travel can be implemented in a structurally simple fashion.

Preferably a limit switch passage receiving means can be provided in the limit switch passage and the linear potentiometer device and the limit switches can be jointly arranged in the limit switch passage receiving means. For that purpose the limit switch passage receiving means can have a semi-hollow profile which extends in the stroke direction and in which the limit switch arrangement and the potentiometer device are non-rotatably arranged. The semi-hollow profile can have inwardly extending holding limbs, holding projections or the like which laterally engage the limit switch arrangement and the potentiometer device for non-rotatably holding same in the limit switch passage receiving means. The use of a semi-hollow profile which is open towards the thrust tube means that assembly can be considerably simplified as, as a result thereof, the limit switch arrangement with the limit switches and the linear potentiometer device can be pushed as individual modules into the limit switch passage in the longitudinal direction from one of the ends of the semi-hollow profile. For greater ease of assembly, that should be effected from the end of the limit switch passage, which is remote from the drive. In principle, the modular structure according to the invention of limit switch-linear potentiometer-limit switch means that any desired stroke length of a linear drive can be detected by means of the linear potentiometer device as the linear potentiometer can be adapted in respect of its lengthwise extent to the stroke length.

The housing itself is desirably in the form of a hollow housing profile with housing end covers. By virtue of that arrangement the hollow housing profile can be produced inexpensively together with the limit switch passage and the limit switch passage receiving means, in an extrusion process. The housing covers are preferably screwed to the hollow housing profile. Preferably there are provided sealing elements, desirably in the form of sealing rings, for sealing off the housing. That arrangement provides that linear potentiometers are arranged in a completely protected condition in the housing. The hollow housing profile is preferably made from aluminum, in which respect the limit switch receiving means extends over the entire length of the hollow housing profile and the fitted housing covers delimit the limit switch passage. Preferably the entire housing is of aluminum. Furthermore the position of the limit switches can be variable in the stroke direction, insofar as for example the limit switches are arranged on a common rail on which they can be fixed in a desired position by a clamping device, such as for example by way of a clamping screw which can be screwed against the limit switch passage receiving means, or the like.

The linear potentiometer device can have a potentiometer receiving means in the form of a semi-hollow profile for receiving the linear potentiometer. By virtue of that design configuration, the potentiometer device can be pre-assembled as a unit on the potentiometer receiving means and, in the assembly operation, together with the limit switches, can be inserted in a succession laterally in the stroke direction into the limit switch passage receiving means in such a way that the linear potentiometer device bears at both ends against a respective limit switch in the stroke direction and is held by the limit switches to prevent displacement thereof in the stroke direction. The limit switches or the limit switch device can in turn be held in such a way as to prevent axial displacement by the housing covers when fitted. For direct measurement engagement of the linear potentiometer against the thrust tube, the potentiometer receiving means should be open towards the thrust tube in the installation position.

In a usual embodiment the linear potentiometer device can have a carrier in the form of a circuit board, with electrical resistance strips which are disposed in the longitudinal direction, and a slider which in the installation position is displaceable relative to the circuit board over the stroke travel and electrically reads off the resistance strips for linear travel measurement over the stroke travel, wherein the circuit board is fixedly connected to the housing in the installation position and the slider is connected to the thrust tube by way of a coupling device. That structure of the linear potentiometer permits simple lengthwise dimensioning, for example for adaptation to a predetermined stroke travel, insofar as the potentiometer receiving means and the circuit board can be set to a desired length. The design configuration of the resistance strip is essential for a length of the linear potentiometer, which is technically viable at the present time, and thus for the possible measurable stroke travel, as a changing measurement current becomes necessary for travel measurement with a changing measurement length.

In a preferred configuration of the potentiometer receiving means there can be provided a U-shaped profile having two limbs and a central crosspiece connecting the limbs, wherein provided at the insides of the limbs in mutually opposite relationship at the same height are two lateral receiving slots which are closer to the central crosspiece for receiving the circuit board and two lateral guide grooves which are more remote from the central crosspiece for receiving and guiding the slider. In this arrangement the circuit board and the slider can be inserted at the end into the semi-hollow profile in the longitudinal direction for assembly purposes. In the installation position to provide for appropriate functioning the circuit board is arranged non-slidably in the stroke direction and the slider is arranged slidably. For maximum stroke travel detection, the circuit board in the installation position should extend over the entire length of the potentiometer receiving means. In that case, in the installation position the circuit board can be secured in the limit switch passage to prevent axial displacement in the potentiometer receiving means, by the limit switches which adjoin it at the end.

In order to be able to arrange the circuit board for example in a pre-assembled linear potentiometer unit non-slidably in the longitudinal direction of the potentiometer receiving means, there can be provided a fixing device for fixing the circuit board in the potentiometer receiving means. For that purpose for example a wedge-shaped clamping element can be inserted into the receiving slots together with the circuit board, for clamping the circuit board fast. Preferably however the fixing device can have a spring element which bears at one side against the central crosspiece and at the other side against the circuit board.

Preferably the spring element is in the form of a cord, a band or the like comprising an incompressible and stretchable material, preferably silicone, wherein the cord is arranged in respect of its longitudinal extent in the stroke direction between the circuit board and the central crosspiece and bears against the circuit board and the central crosspiece under a spring force in a fixing condition. In accordance with its material properties, the silicone cord when under tension experiences a proportional reduction in its cross-section uniformly over the cord length, without any significant constriction or narrowing effect. When the silicone cord is relieve of stress, its cross-section is correspondingly increased again.

For more exact positioning of the cord, a cord groove extending in the longitudinal direction can be provided at the inside of the central crosspiece, for receiving the cord, in which case in the fixing condition the cord projects beyond the cord groove perpendicularly to its longitudinal direction. For assembling and fixing the circuit board in the potentiometer receiving means, the cord which is fitted into the potentiometer receiving means or into the cord groove can be stressed to such an extent that, as a consequence of the uniform reduction in cross-section of the cord over the cord length the circuit board can be pushed laterally into the potentiometer receiving means. When the circuit board has reached its position in the potentiometer receiving means, then the cord can be relieved of stress, whereby the cord expands over its cross-section and, building up a mechanical stressing effect, comes to bear against the circuit board and the central crosspiece. Preferably in its fixing position the cord should project beyond the ends of the cord groove in the longitudinal direction so that it can be gripped again at the end and tensioned, for releasing and/or replacing the circuit board.

In addition the circuit board with the resistance strips should be functionally arranged in such a way that the resistance strip is towards the slider which, at its side towards the circuit board, has wiper or sliding contacts, preferably comb-shaped sliding contacts, which in the installation position bear slidably in the stroke direction against the resistance strips under the spring stress provided. To achieve long service lives, the resistance strips should be designed to be as wear-resistant as possible. In that case the resistance strips which have been developed by Metallux and which are referred to as conductive plastic are preferred.

The limit switch passage can have a preferably laterally enclosed guide passage for guiding electric lines, pipes and hoses and the like. Desirably the guide passage can be integrated in the potentiometer receiving means. Accordingly, the potentiometer arrangement and the limit switch arrangement can provide a prefabricated model which, at the end, together with the limit switch passage receiving means which is separate from the limit switch passage, can be pushed into the limit switch passage receiving means or, in the case of a limit switch passage receiving means which is integrated into the limit switch passage, it can be inserted directly thereinto. The guide passage can be formed by a second U-shaped profile at the potentiometer receiving means at the side of the central crosspiece which is remote from the limbs, by the central crosspiece, and two guide passage projections which extend preferably perpendicularly from the central crosspiece and which preferably extend over the length of the potentiometer receiving means. The second U-shaped profile can be laterally completely closed by a side wall of the limit switch passage or the limit switch passage receiving means. By virtue of that arrangement the lines can be guided in a completely protected condition and cannot hinder travel measurement.

In accordance with the foregoing embodiment in the installation position the circuit board is arranged in a plane extending tangentially relative to the thrust tube. The circuit board can also be arranged perpendicularly thereto in the longitudinal direction, in which case resistance strips can be provided at both sides. By virtue of that arrangement, separate pick up on the part of the entrainment member is possible on both sides of the circuit board, and that permits double travel measurement.

In a preferred development of the invention the coupling device can have a coupling receiving means fixedly connected to the thrust tube and an entrainment member fixedly connected to the slider, wherein the entrainment member engages with a coupling end releasably into the coupling receiving means in a coupling position. Preferably in the coupling position the entrainment member engages into the receiving means in force-locking and/or positively locking relationship in the stroke direction. In this case the coupling receiving means can have a shaft opening or the like which extends radially with respect to the thrust tube and which is open radially outwardly towards the linear potentiometer and against the side walls of which the entrainment member bears slidably in a plane perpendicular to the stroke travel. That arrangement provides that transmission of forces in the peripheral and radial directions is substantially avoided in the coupling position.

It is preferably provided however that the entrainment member engages under a spring prestressing into the coupling receiving means in the coupling position by way of a spring device which acts perpendicularly to the stroke direction and towards the coupling receiving means. A uniform contact pressure for the entrainment member into the coupling receiving means is achieved by way of the spring device. In addition travel variations within the spring travel perpendicularly to the stroke travel and towards the coupling receiving means can also be compensated without decoupling of the entrainment member and the coupling receiving means.

In one configuration, the entrainment member can be in the form of a part of the spring device in the form of a leaf spring element which is clamped in position at one end and which, with its free end in the form of a coupling end, engages into the coupling receiving means. For that purpose, at its clamped end the entrainment member can have a tongue with a latching element at its end, wherein the tongue engages into a suitable slot in the slider at least with a portion of the travel movement in the stroke direction and at the end latches with the latching element in the slot.

In a desirable configuration of the coupling device the coupling end can have a cylindrical rounding, the cylindrical longitudinal axis of which extends perpendicularly to the axial and the radial directions with respect to the thrust tube, and the coupling receiving means can have a suitably adapted coupling groove for receiving the coupling end. That arrangement provides that the coupling end engages into the coupling receiving means in force-locking and/or positively locking relationship in the coupling position with respect to the thrust tube only axially in the stroke direction and in a radial direction towards the thrust tube.

In a preferred development of the invention the coupling receiving means can have a lug which extends in the stroke direction and which has a switching profile. The switching profile can have at least one actuating projection or the like for actuating one of the limit switches. The coupling groove can be arranged in a central portion of the lug. Both end portions of the lugs can have a switching profile with an actuating projection.

Besides simplification of the structure of the coupling device, installation of the linear potentiometer and coupling of the entrainment member into the coupling receiving means can also be simplified and automated. For the installation procedure the slider can be arranged in any position on its displacement travel path in the potentiometer receiving means and in the installation position of the potentiometer receiving means in the limit switch passage, if it is not immediately coupled into the coupling receiving means by chance with the coupling end of its entrainment member, it is disposed at a location corresponding to its position, with respect to the thrust tube. When the thrust tube with the coupling receiving means and the connected lug is displaced in the thrust direction, the coupling receiving means with lug and coupling groove passes over the coupling end which, in accordance with the radial extent of the coupling receiving means, is prestressed radially outwardly and latches into the coupling groove automatically by way of the spring prestressing when the coupling groove is reached. In order to facilitate that operation the slider in the installation procedure can be arranged at the end of the potentiometer receiving means, which is remote from the drive, while the thrust tube is displaced substantially back into the housing and as a result the spindle nut is in a position close to the drive. With displacement of the spindle nut towards the slider, the coupling end of the slider will be passed over by the lug, as described above, until the coupling end latches into the coupling receiving means under the spring force while the slider is held non-slidably in its position by the limit switch arranged at the end. Desirably, for the coupling end to more easily slide on to the coupling receiving means, in the transition to the actuating projection, the switching profile can have an inclined surface or the like as an inclined plane, as will be described in greater detail hereinafter in connection with actuation of the limit switches by the actuating projection.

A respective switching lug with an end switching profile for the actuation of a limit switch can also be provided at each side of the coupling receiving means in the stroke direction. Instead of a second lug with a second switching profile a radially outwardly facing projection in the form of an actuating projection, as described hereinbefore, can be provided on the spindle nut for actuation of the limit switch which can switch off the drive after being contracted. In order to prevent the coupling end from hooking fast upon automatic introduction of the coupling end into the coupling receiving means, a transitional element can be provided between the coupling receiving means and the projection.

The stroke travel can be determined by way of the length of the switching lug, that is to say the distance of the actuating end from the coupling receiving means. It can therefore be provided that the length of the switching lug is adjustable by the switching lug for example having two components which are displaceable in each other in the stroke direction and which can be fixed relative to each other in the desired displacement position.

For actuation thereof, the limit switch can have a resiliently supported pressure feeler member which in the installation position is actuable axially with respect to the thrust tube. For more easily passing over the pressure feeler member the switching lug can have a switching profile which rises outwardly in the radial direction of the thrust tube and which has an actuating projection. Preferably, an inclined plane is provided in the transition to the actuating projection in the stroke direction.

In a development thereof, the switching profile can be of a configuration which is stepped in the stroke direction, with at least two actuating projections. Preferably inclined planes are provided in the transition between the steps. That arrangement provides that the pressure feeler member can be correspondingly moved in steps into the limit switch, wherein a switching signal can be produced when passing through each step. In dependence on the relative arrangement thereof with respect to each other in the direction of the stroke travel, a plurality of successively arranged limit switches or switching knobs can be actuated by way of the steps simultaneously or in time-displaced relationship.

Preferably, there can be provided a memory circuit, by way of which the drive can be moved to a given position in respect of the linear potentiometer and thus over a given stroke movement, for example in order to move back into a previously used position, in order to move to a set, user-specific position or in order to perform a given or random sequence of stroke movements, preferably in programmable fashion.

BRIEF DESCRIPTION OF THE DRAWINGS

The present invention is described in greater detail hereinafter by means of an embodiment illustrated in the drawing in which:

FIG. 1 shows a perspective side view of a linear drive in the contracted position, with some housing portions omitted, FIG. 2 shows a view in longitudinal section of the linear drive of FIG. 1 but turned through about 180°, FIG. 3 shows a perspective side view of the linear drive of FIG. 1 but in an almost extended position, FIG. 4 shows a view in longitudinal section of the linear drive of FIG. 3 but turned through 180°, FIG. 7 shows a perspective view from below of a switching lug alone, FIG. 8 shows a further perspective view from below of the switching lug.

DETAILED DESCRIPTION

Figure 5:
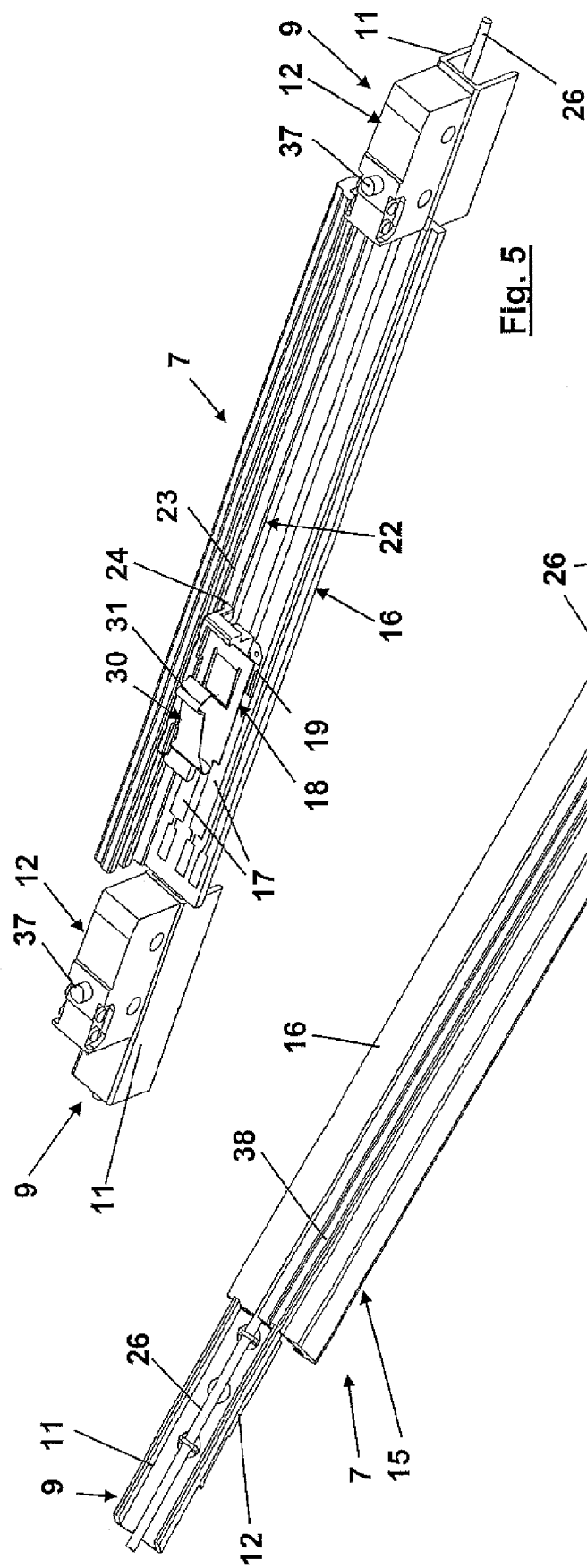
FIG. 5 shows a perspective view of a linear potentiometer arrangement with adjoining limit switch arrangement, with parts of both arrangements being omitted.

FIGS. 1 through 4 each show a linear drive 1 as a perspective side view and as a view in longitudinal section which however, for greater ease of representation, is turned through about 180° with respect to the perspective side view, in a retracted position (FIG. 1 and FIG. 2) and in an almost extended position (FIG. 3 and FIG. 4). The linear drive 1 has a linear stroke for displacement of movably supported parts which are not shown here, in particular of articles of furniture. The linear drive 1 includes a rotary spindle 2 which is driven by a drive A (only partly shown here) and which at the drive output side is in screwthreaded engagement with a spindle nut 4 which is connected to a thrust tube 3 and which has a female screwthread 5, wherein the thrust tube 3 is supported non-rotatably and slidably in a housing 6 and is displaceable over a stroke travel h relative to the rotary spindle 2 in the housing 6. For the sake of improved clarity of the drawing, parts of the housing 6 have been omitted from FIGS. 1 through 4.

In accordance with the invention, a linear potentiometer device 7 having a linear potentiometer 8 is provided for linear measurement of the stroke travel h. The linear potentiometer 8 is arranged in parallel relationship with the stroke travel h in the housing 6 and is connected to the housing 6 and by way of the spindle nut 4 to the thrust tube 3. The rotary spindle 2 is supported immovably relative to the housing 6 so that the linear stroke is produced by way of the relative movement of the housing 6 and the thrust tube 3. For the sake of enhanced clarity parts of the linear potentiometer device 7 have been omitted from FIGS. 1 through 4.

The linear potentiometer device 7 with the linear potentiometer 8 is arranged in a limit switch passage 10 provided for a limit switch device 9. The limit switch passage 10 extends parallel to the thrust tube 3 and is open towards the thrust tube 3 so that the limit switch passage 10 together with the rest of the housing 6 forms a common housing chamber.

The limit switch device 9 has two limit switches 12 which are respectively mounted on a base 11 and which bear abuttingly at the ends against the linear potentiometer 8. In this configuration of the linear drive 1 the limit switches 12 act as emergency off switches which, upon failure of the linear potentiometer device 7, upon attaining the maximum stroke travel h, are intended to switch off the drive. For safety it is thus provided that the drive is already switched off, by way of the linear potentiometer device 7, before attaining the maximum stroke travel h, at a working stroke $h_a$ which is programmable or adjustable by way of travel measurement. As is not further shown in the Figures, there is provided a control for the linear drive 1 by way of the linear potentiometer device 7, which controls and/or regulates drive-side parameters such as drive moment and travel movement speed of the thrust tube 3, and adjustable working stroke $h_a$. The stroke travel h and the working stroke $h_a$ shown in FIGS. 1 and 2 are selected to be comparatively short, in order to provide for a clear representation of the individual component parts of the linear drive. As the linear potentiometer can be of any desired size in respect of its longitudinal extent within the possible structural sizes of the linear drive, the stroke travel h can also be of any corresponding size.

The limit switch passage 10 includes a limit switch passage receiving means 13 in the form of a semi-hollow profile which extends in the stroke direction x, with inwardly extending holding legs which laterally engage the limit switch device 9 and the linear potentiometer device 7 for non-rotatably holding same in the limit switch passage receiving means 13. The housing 6 includes two covers 14 and a hollow profile which is not shown in FIGS. 1 through 4 and which, together with the covers 14, forms an internal space of the linear drive 1 with the limit switch passage 10. The covers 14 bear in the stroke direction x against the limit switches 12 for non-slidably supporting same in the limit switch passage 10 so that, with the linear potentiometer 8 bearing against the limit switches 12, the limit switches 12 and the linear potentiometer 8 are supported non-slidably in the limit switch passage 10.

Figure 6:
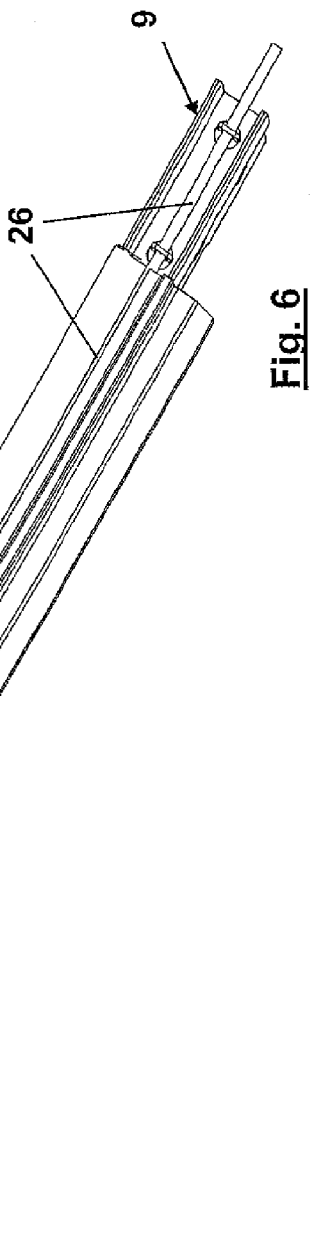
FIG. 6 shows a perspective view from below of the arrangements of FIG. 5.

As can also be seen in particular from FIGS. 5 and 6 showing perspective views of the linear potentiometer device 7 and the limit switch device 9, there is provided a potentiometer receiving means 14 in the form of a semi-hollow profile for receiving the linear potentiometer 8, wherein one of the two longitudinal halves of the potentiometer receiving means has been omitted from FIGS. 1 through 6 for greater clarity of representation. The linear potentiometer device 7 has a carrier in the form of an elongate circuit board 16, with electrical resistance strips 17 extending in the longitudinal direction, as well as a slider 18 which in the installation position is displaceable relative to the circuit board 16 over the stroke travel h and which electrically taps off from the resistance strips 27 for linear travel measurement over the stroke travel h by means of comb-shaped wiper or sliding contacts 19 which are arranged at the underside and which are guided in resilient contact against the resistance strips 17. The potentiometer receiving means 15 is in the form of a U-shaped profile comprising two limbs 20 and a central crosspiece 21 connecting the limbs 20. Provided at the insides of the limbs and in mutually opposite relationship at the same height are two lateral receiving slots 22 which are arranged closer to the central crosspiece for receiving the circuit board 16 and two lateral guide grooves 23 which are arranged further away from the central crosspiece 21 for receiving and guiding the slider 18.

Figure 9:
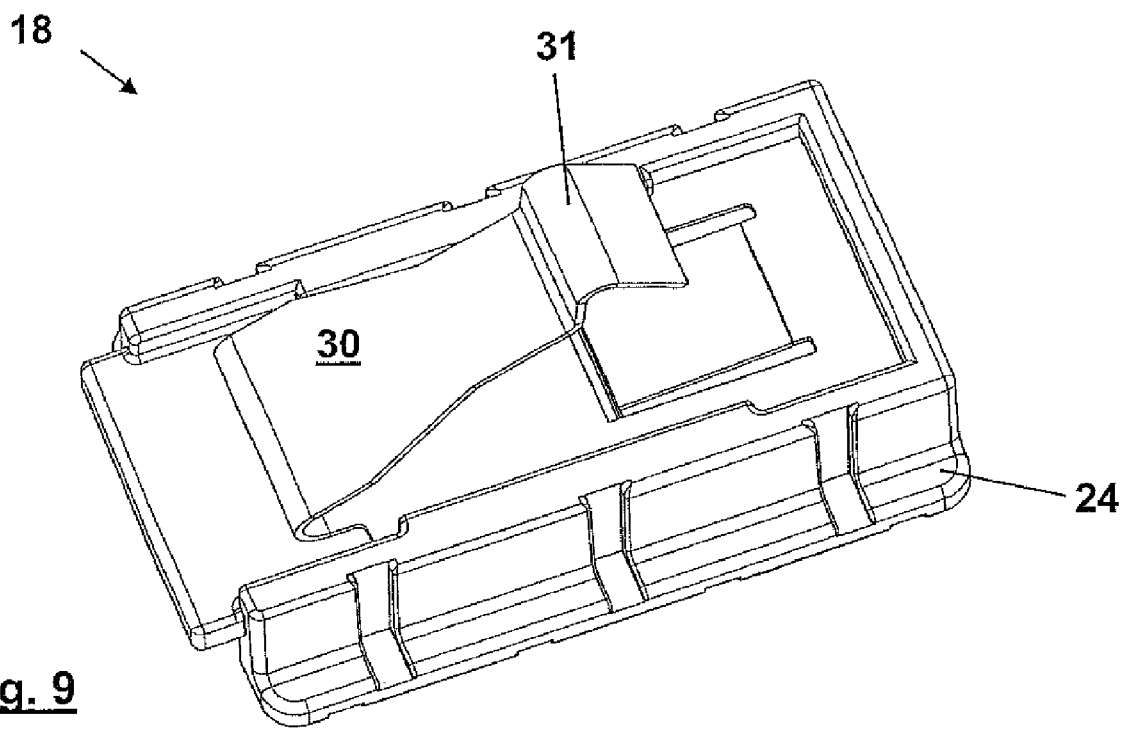
FIG. 9 shows a perspective view of a slider.
Figure 10:
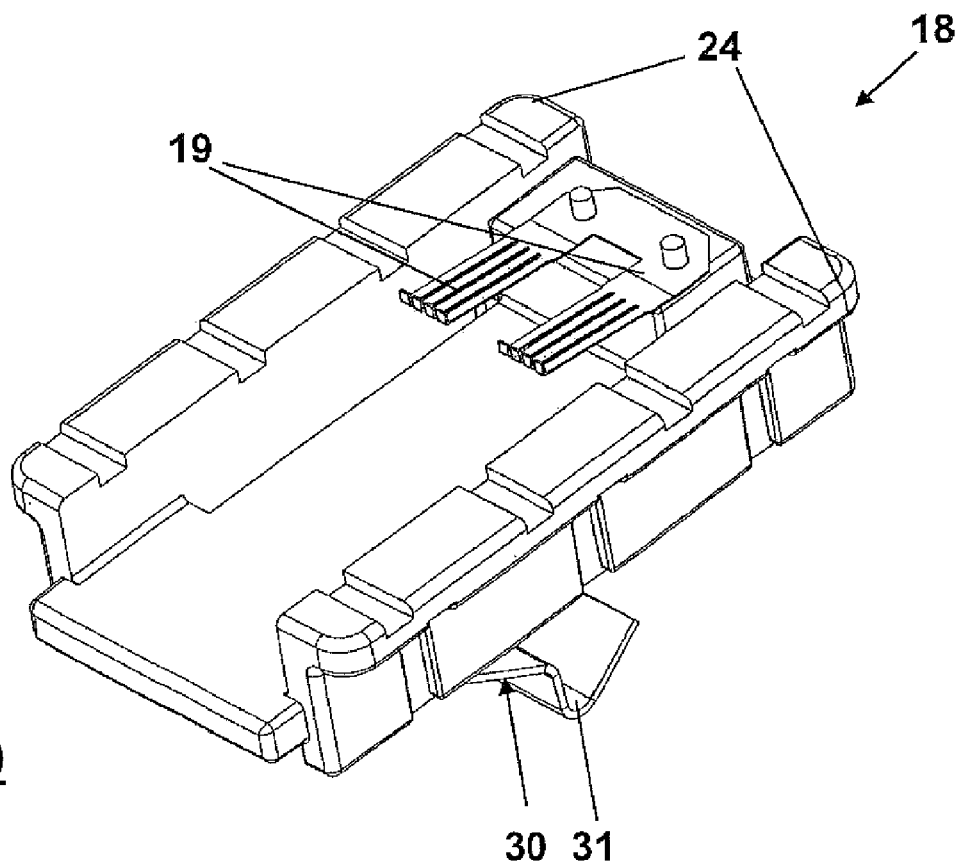
FIG. 10 shows a perspective view from below of the slider.

The slider 18 in itself is shown separately in FIGS. 9 and 10 in the form of a perspective view and a view from below thereof, and corresponds to a usual design configuration wherein the sliding contact 19 is in the form of a bridge which connects the two resistance strips 17 so that the maximum length of the resistance strips 17 corresponds to double the length of the stroke travel h, thereby permitting more accurate travel measurement. The slider 18 has two lateral guide projections 24 in the longitudinal direction of the slider, which engage into the guide grooves 23 of the potentiometer receiving means 15 in the installation position, to guide the slider 18. In addition the slider 18 bears slidably with its longitudinal side surfaces against the insides of the limbs 20 so that overall this arrangement provides for stable guidance for the slider 19 in the potentiometer receiving means 15.

Figure 11:
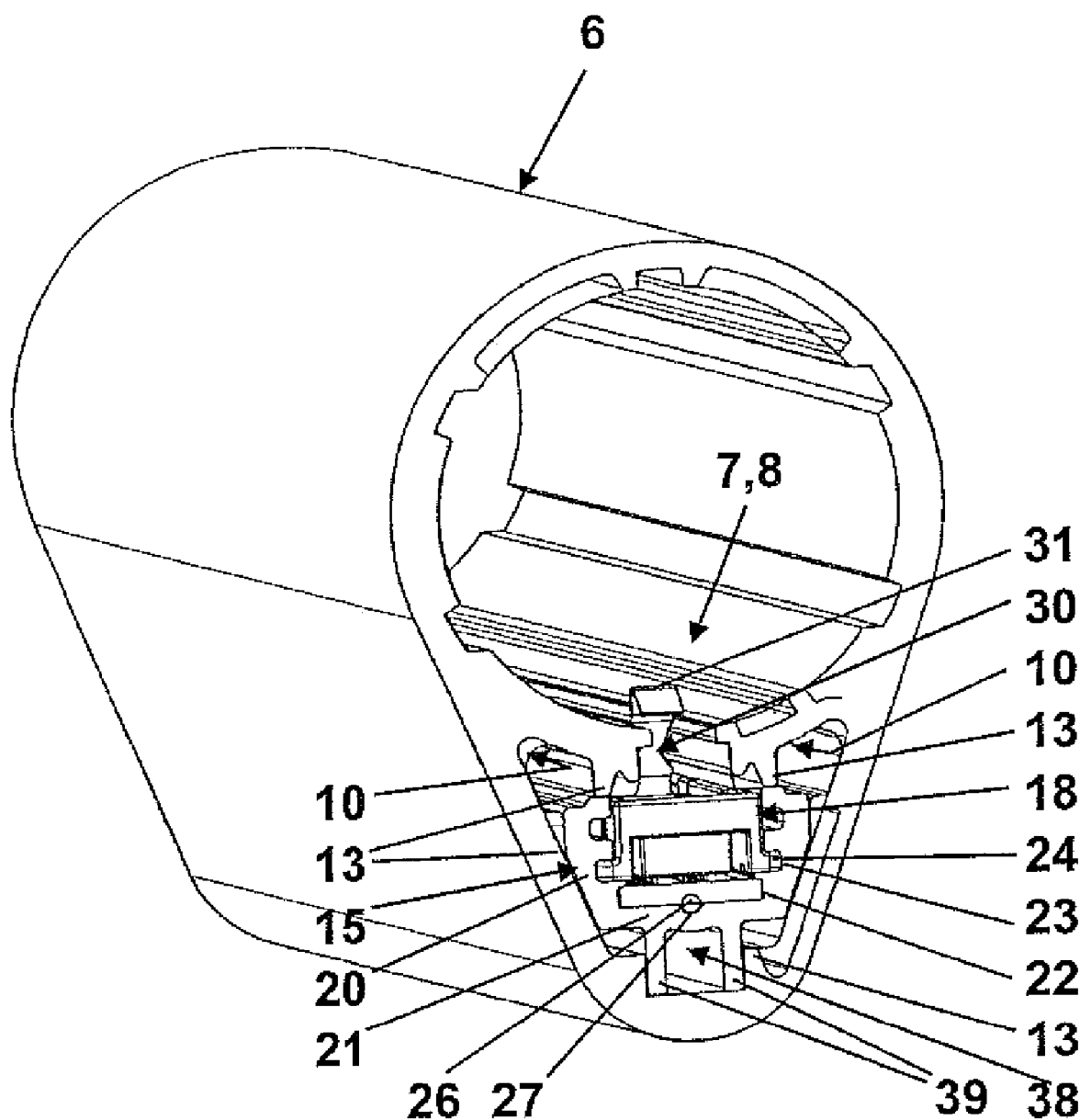
FIG. 11 shows a perspective side view of a housing portion of the linear drive with an internally arranged linear potentiometer device.

The particular manner of mounting the linear potentiometer 8 with the entrainment member 30 connected to the slider 18 in the potentiometer receiving means 15 or in the limit switch receiving means 13 respectively of the limit switch passage 10 is clearly shown in FIG. 11, a perspective side view of a portion of the hollow profile of the housing 6, with the internally arranged linear potentiometer device 7.

The circuit board 16 can be pushed at the end into the receiving slots 22 and the slider 18 can be pushed at the end into the guide grooves 23 of the potentiometer receiving means 15, the length of the circuit board 16 being equal to the length of the potentiometer receiving means 15. That arrangement provides that in the installation position the circuit board 16 is supported non-slidably in the stroke direction x by the limit switches 12 abutting thereagainst. In order however to already provide for non-slidable mounting of the circuit board 16 in the potentiometer receiving means 15 in the pre-assembled condition prior to installation of the linear potentiometer device 7 which can also be effected in already existing conventional linear drives of the same kind without a provided linear potentiometer device 7, and in order also to be able to implement subsequent adjustment which can be required for example due to dimensional inaccuracies in respect of the length of the potentiometer receiving means 15 and the circuit board 16, there is additionally provided a fixing device 25 which, in this embodiment, has a cord 26 acting as a spring element. In its longitudinal extent, the cord 26 is arranged in the stroke direction x between the circuit board 16 and the central crosspiece in a cord groove 27, wherein the cord 26, in a fixing condition, bears under stress against the circuit board 16 and the central crosspiece 21 and projects beyond the cord groove 27.

The cord 26 is made from silicone, an incompressible and stretchable material. Accordingly the cord 26 of silicone retains its volume even under an external mechanical loading. If the cord 26 is subjected to a tensile loading, the length of the cord 26 increases, with at the same time a uniform reduction in cross-section over its length. When the load on the cord 26 is relaxed, the cord 26 goes back to its original dimensions prior to the application of the tensile loading. In the fixing condition, the cord 27 is subjected to no or only a very slight tensile stress. In order more easily to grip the cord 27, the cord length is such that the ends of the cord project at the ends beyond the potentiometer receiving means 15, even in the relaxed condition of the cord. For lateral insertion of the circuit board 16 into the potentiometer receiving means 15 the cord 26 is subjected to a tensile loading whereby its cross-section is reduced to such a degree that the circuit board 16 can be introduced at the end into the receiving slots 22 and can be guided over the tensioned cord 26. When the load on the cord 26 is relieved, the cord bears in a stressed condition against the circuit board 16 and the central crosspiece 21, in the fixing condition. In order for example to displace the circuit board 16 in the potentiometer receiving means 15 or to replace it, the cord 26 is again subjected to a tensile loading, with a reduction in its cross-section, to such an extent that it allows axial displacement of the circuit board 16 in the guide grooves 23.

The slider 18 is connected to the thrust tube 3 by way of a coupling device 28. For that purpose the coupling device 28 has a coupling receiving means 29 which is fixedly connected to the thrust tube 3 and an entrainment member 30 which is fixedly connected to the slider 18, wherein the entrainment member 30 engages with a coupling end 31 releasably into the coupling receiving means 29, in a coupling position as shown in FIGS. 1 and 2. The entrainment member 30 in itself is in the form of a leaf spring and thus presses with its coupling end 31 under a spring force into the coupling receiving means in a radial direction with respect to the thrust tube 3 so that, even in the event of minor deviations in the spacing between the slider 18 and the coupling receiving means 19, in the course of the spring travel of the entrainment member 30, this arrangement guarantees engagement of the coupling end 31 of the entrainment member 30 into the coupling groove 32.

Provided at the side, remote from the limbs 20, of the central crosspiece 21 of the potentiometer receiving means 15 is a guide passage 38 for guiding electric lines (not shown here) of the limit switches 12, which is continued through the bases 11 of the limit switches 12. The lines are protected in the guide passage 38 on the one hand and on the other hand cannot impede the travel measurement procedure. In this embodiment the guide passage 38 is formed in the potentiometer receiving means 15 by means of a further U-shaped profile and is formed by a side surface of the limit switch passage receiving means 13, wherein the U-shaped profile includes the central crosspiece 21 and two guide passage projections 39 which extend approximately perpendicularly with respect to the central crosspiece 21 from the side of the central crosspiece 21, which is remote from the limbs 20, the projections 39 extending over the length of the U-shaped profile. The bases 11 are also in the form of a U-shaped profile which, together with the side surface of the limit switch passage receiving means 13, forms the continuation of the guide passage 38.

The coupling receiving means 29 is connected to the thrust tube 3 by way of a fixing device 33 having two fixing projections 34 by way of the spindle nut 4, wherein the fixing projections 34 bear laterally against a projection of the spindle nut 4, in the form of an actuating projection 35, and which are secured in the fixing position shown in FIGS. 1 and 3 by a screw (not shown here) which is passed through fixing holes. The actuating projection 35 serves for actuation of the limit switch 12 which is at the left in FIGS. 1 and 3 and by which the drive A is switched off in the position of the linear drive 1 in which the thrust tube 3 is moved completely into the housing 6.

The limit switch 12 is provided with a resiliently supported pressure feeler member 32 which can be actuated radially with respect to the thrust tube and which, when the actuating projection 35 passes thereover, is pressed radially outwardly into the limit switch 12 and is actuated therewith. Upon release of the pressure feeler member 37 by displacement of the thrust tube 3 out of the housing 6 the pressure feeler member 37 returns to its original position. For easier displacement of the actuating projection 35 over the pressure feeler member 37, the end of the pressure feeler member 37 is provided with an inclined surface and the free end face of the pressure feeler member 37 is convexly outwardly rounded. The coupling receiving means 29, at its end remote from the fixing projection 34, is also shaped to provide an actuating projection 35 with an inclined surface, by way of which the limit switch 12 shown at the right in FIGS. 1 and 3 is actuated by depression of the pressure feeler member 37 when the thrust tube 3 is displaced out of the housing 6 over the intended maximum stroke travel.

The coupling receiving means 29 which by virtue of that arrangement is of a lug-like configuration is adapted at its side towards the thrust tube 3 to the rounding of the thrust tube 3 so that the coupling receiving means 29 bears snugly and non-rotatably and non-slidably against the thrust tube.

As, in the embodiment illustrated here, the lug-like coupling receiving means 29 is adapted to the thrust tube 3 and in particular to the actuating projection 35 of the spindle nut 4, it can be installed with the linear potentiometer device 7 into an already existing linear drive in which previously both limit switches 12 were actuated by the actuating projection 35 of the spindle nut 4.

FIGS. 1 and 3 show by way of example how, upon assembly of the linear drive 1, with the insertion of the linear potentiometer device 7 into the limit switch passage 10, the entrainment member 30 can be moved with its coupling end 31 automatically into the receiving groove 32 of the coupling receiving means 29, by displacement of the thrust tube 3 from any position relative to the thrust tube 3 over the stroke travel h. For that purpose, as shown in FIG. 3, upon installation in the limit switch passage 10 the slider 18 can bear against the right-hand limit switch 12 while the receiving groove 32 of the coupling receiving means 29 is at a position over the stroke travel h between the coupling end 31 of the entrainment member 30 and the left-hand limit switch. When now the thrust tube 3 is moved out of the housing 6, the actuating projection 35 bears with its inclined surface against the coupling end 31 which passes over the inclined surface and the actuating projection 35 until it snaps in latching engagement into the receiving groove 32 as a consequence of the spring force of the entrainment member 30.

The receiving groove 32 and the coupling end 31 are of a semi-cylindrical shape which is matched to each other, wherein the coupling end portion 31 at the end thereof terminates in an inclined surface which makes it easier to slide against the inclined surface of the actuating projection 35 of the spindle nut 4 when the coupling end 31 and the receiving groove 32 move together in assembly of the linear drive 1. FIG. 1 shows the position in which the coupling end 31 and the receiving groove 32 are brought together.

The position shown in FIG. 3 of the slider 18 for bringing the coupling end 31 and the receiving groove 32 together is advantageous insofar as, in that position, the slider 18 bears against the limit switch 12 and is thus not further axially displaced in the stroke direction x, with the extension movement of the thrust tube 3 out of the housing 6. Accordingly, movement of the coupling end 31 into the receiving groove 32 is made easier by way of the coupling end 31 sliding over the inclined surface and the actuating projection 35 of the coupling receiving means 39. Nonetheless it is possible for the coupling end 31 to be displaced into the coupling groove 32 in any position with respect to the receiving groove 32 over the stroke travel h by displacement of the thrust tube 3, by a procedure whereby the coupling end 31, in dependence on its relative position with respect to the thrust tube 3, is displaced against the inclined surface of one of the two actuating projections 35, the slider 18 is displaced over the entrainment member 30 against one of the switching knobs 37, and the coupling end 31, as described hereinbefore, sliding over the inclined surface and the actuating projection 35, snaps into latching engagement in the receiving groove 32.

LIST OF REFERENCES 1 linear drive
2 rotary spindle
3 thrust tube
4 spindle nut
5 female screwthread
6 housing
7 linear potentiometer device
8 linear potentiometer
9 limit switch device
10 limit switch passage
11 base
12 limit switch 13 limit switch passage receiving means
14 cover
15 potentiometer receiving means
16 circuit board
17 resistance strip
18 slider
19 sliding contact
20 limb
21 central crosspiece
22 receiving slot
23 guide groove
24 guide projection
25 fixing device
26 cord
27 cord groove
28 coupling device
29 coupling receiving means
30 entrainment member
31 coupling end
32 coupling groove
33 fixing device
34 fixing projection
35 actuating projection
36 fixing hole
37 pressure feeler member
38 guide passage
39 guide passage projection
h stroke travel
$h_a$ working stroke
x stroke direction

The invention claimed is:

1. A linear drive with a linear stroke for the displacement of movably supported parts, in particular of articles of furniture, comprising a rotary spindle which is driven by a motor and which at the drive output side is in screwthreaded engagement with a thrust tube or a spindle nut connected thereto with a female screwthread, wherein the thrust tube is mounted non-rotatably and slidably in the housing and is displaceable in the housing over a stroke travel h relative to the rotary element, and a travel measuring device for measuring the stroke travel h, characterised in that the travel measuring device has a linear potentiometer device with a linear potentiometer and that the linear potentiometer for linear measurement of the stroke travel is arranged parallel to the stroke travel.

2. A linear drive as set forth in claim 1 characterised in that the linear potentiometer is arranged in the housing.

3. A linear drive as set forth in claim 1 characterised in that the linear potentiometer is connected to the thrust tube and to the housing.

4. A linear drive as set forth in claim 1 characterised in that there is provided a limit switch device having two limit switches for stroke-limiting shut-down of the motor, that the limit switches are arranged in a limit switch passage of the housing in parallel relationship with the thrust tube in the housing and that the linear potentiometer device is arranged in the limit switch passage.

5. A linear drive as set forth in claim 4 characterised in that a limit switch passage receiving means is provided in the limit switch passage and that the linear potentiometer device and the limit switches are arranged jointly in the limit switch passage receiving means.

6. A linear drive as set forth in claim 5 characterised in that the limit switch passage receiving means has a semi-hollow profile which extends in the stroke direction x and in which the limit switch device and the potentiometer device are non-rotatably arranged.

7. A linear drive as set forth in claim 1 characterised in that the linear potentiometer device has a carrier in the form of an elongate circuit board, with electrical resistance strips extending in the longitudinal direction, and a slider which in the installation position is displaceable over the stroke travel relative to the circuit board and electrically taps off the resistance strips for linear travel measurement over the stroke travel h, wherein the circuit board in the installation position is fixedly connected to the housing and the slider is connected to the thrust tube by way of a coupling device.

8. A linear drive as set forth in claim 7 characterised in that the linear potentiometer device has a potentiometer receiving means in the form of a semi-hollow profile for receiving the linear potentiometer.

9. A linear drive as set forth in claim 8 characterised in that the potentiometer receiving means has a U-shaped profile with two limbs and a central crosspiece connecting the limbs, wherein provided at the insides of the limbs in mutually opposite relationship at the same level are two lateral receiving slots which are closer to the central crosspiece for receiving the circuit board and two lateral guide grooves which are more remote in relation to the central crosspiece for guiding the slider.

10. A linear drive as set forth in claim 9 characterised by a fixing device for axially non-slidably mounting the circuit board in the potentiometer receiving means.

11. A linear drive as set forth in claim 10 characterised in that the fixing device has a spring element which is supported at one side against the central crosspiece and at the other side against the circuit board.

12. A linear drive as set forth in claim 11 characterised in that the spring element is a cord, a band or the like of an incompressible and stretchable material, preferably silicone, wherein the cord is arranged in respect of its longitudinal extent in the stroke direction x between the circuit board and the central crosspiece and in a fixing condition bears in a stressed condition against the circuit board and the central crosspiece.

13. A linear drive as set forth in claim 12 characterised in that provided at the inside of the central crosspiece is a cord groove extending in the longitudinal direction for receiving the cord, wherein the cord in the fixing condition projects beyond the cord groove in perpendicular relationship to the longitudinal direction thereof.

14. A linear drive as set forth in claim 7 characterised in that the coupling device has a coupling receiving means fixedly connected to the thrust tube and an entrainment member fixedly connected to the slider, wherein the entrainment member engages with a coupling end into the coupling receiving means releasably and force-lockingly and/or positively lockingly in the stroke direction x in a coupling position.

15. A linear drive as set forth in claim 13 characterised in that the entrainment member engages under spring prestressing into the coupling receiving means in the coupling position by way of a spring device which is operative perpendicularly to the stroke direction x and towards the coupling receiving means.

16. A linear drive as set forth in claim 15 characterised in that the entrainment member is part of the spring device in the form of a leaf spring element which is clamped at one end and which with its free end in the form of the coupling end engages into the coupling receiving means.

17. A linear drive as set forth in claim 14 characterised in that the coupling receiving means has a switching lug extending in the stroke direction x in the installation position, with at least one switching profile for actuation of one of the limit switches.

18. A linear drive as set forth in claim 17 characterised in that the coupling end has a cylindrical rounding whose cylindrical longitudinal axis in the installation position extends perpendicularly to the axial and radial direction with respect to the thrust tube and that the coupling receiving means has a correspondingly adapted coupling groove for receiving the coupling end.

19. A linear drive as set forth in claim 17 characterised in that the limit switch includes a resiliently mounted pressure feeler member which is actuable axially with respect to the thrust tube in the installation position and that the switching profile has at least one actuating projection which rises outwardly in the radial direction of the thrust tube for actuation of the pressure feeler member.

20. A linear drive as set forth in claim 19 characterised in that the switching profile is of a configuration which is stepped in the stroke direction, with a plurality of actuating projections.

\* \* \* \* \*